(12) United States Patent
Gawronski et al.

(10) Patent No.: US 11,485,675 B2
(45) Date of Patent: Nov. 1, 2022

(54) CONTRAST ENHANCING GLASS FOR SUNGLASS LENSES

(71) Applicant: Barberini GmbH, Grünenplan (DE)

(72) Inventors: Antje Gawronski, Alfeld (DE); Simon Striepe, Rosdorf (DE); Ottmar Bartels, Alfeld (DE)

(73) Assignee: Barberini GmbH, Grünenplan (DE)

( * ) Notice: Subject to any disclaimer, the term of this patent is extended or adjusted under 35 U.S.C. 154(b) by 597 days.

(21) Appl. No.: 16/368,285

(22) Filed: Mar. 28, 2019

(65) Prior Publication Data

US 2019/0322570 A1 Oct. 24, 2019

Related U.S. Application Data

(63) Continuation of application No. PCT/EP2019/057915, filed on Mar. 28, 2019.

(60) Provisional application No. 62/660,453, filed on Apr. 20, 2018.

(30) Foreign Application Priority Data

Apr. 20, 2018 (EP) .................... 18168477

(51) Int. Cl.
  *C03C 3/095* (2006.01)
  *C03C 3/11* (2006.01)
  *G02C 7/10* (2006.01)
  *C03B 11/00* (2006.01)

(52) U.S. Cl.
  CPC ............... *C03C 3/111* (2013.01); *C03B 11/00* (2013.01); *C03C 3/095* (2013.01); *C03C 3/11* (2013.01); *G02C 7/10* (2013.01)

(58) Field of Classification Search
  CPC . C03C 3/095; C03C 3/11; C03C 3/111; C03C 3/093; C03C 4/02; C03C 4/08; C03C 4/085
  See application file for complete search history.

(56) References Cited

U.S. PATENT DOCUMENTS

| 4,088,023 A * | 5/1978 | Berleue .................... C03C 3/062 501/152 |
| 4,769,347 A | 9/1988 | Cook |
| 5,039,631 A * | 8/1991 | Krashkevich ......... C03C 21/002 501/64 |
| 5,061,659 A | 10/1991 | Ciolek |
| 5,190,896 A | 3/1993 | Pucilowski et al. |
| 5,446,007 A | 8/1995 | Krashkevich et al. |
| 6,498,118 B1 | 12/2002 | Landa |
| 2018/0170796 A1* | 6/2018 | Brocheton ................ C03C 3/11 |

FOREIGN PATENT DOCUMENTS

| CN | 1338442 A | 3/2002 | |
| CN | 1810691 A * | 8/2006 | ............ C03C 3/085 |
| DE | 102015224374 B3 | 11/2016 | |
| EP | 1918259 A1 | 5/2008 | |
| JP | S4911111 A | 11/1974 | |
| JP | 53085813 A * | 7/1978 | ............ C03C 3/102 |
| JP | S5385813 | 7/1978 | |
| JP | S6183645 A | 4/1990 | |
| JP | S6379736 A | 6/1992 | |
| JP | H11314934 A | 11/1999 | |
| KR | 1999-0038170 | 6/1999 | |
| SU | 1273339 | 11/1986 | |
| SU | 1273339 A1 * | 11/1986 | ............ C03C 13/00 |

OTHER PUBLICATIONS

European Patent Office, Int'l Search Report; dated Jun. 18, 2019.
Patent Cooperation Treaty, PCT; International Report on Patentability; PCT/IPEA/409; dated Jan. 8, 2020.
National Intellectuel Property Administration of the People'Republic of China, Apr. 29, 2022; Office Action for App'l No. 201980027127.3.

* cited by examiner

*Primary Examiner* — Elizabeth A. Bolden
(74) *Attorney, Agent, or Firm* — Pitts & Lake, P.C.

(57) ABSTRACT

A glass composition, including contrast enhancing glass and contrast enhancing sunglass, having approximately 45-65 wt.-%, $SiO_2$, 0-12 wt.-% $B_2O_3$, 0-15 wt.-%, $Na_2O$, 0-10 wt.-% $K_2O$, and 10 0-7 wt.-% ZnO, 1-12 wt.-% $Nd_2O_3$, 1-10 wt.-% $Er_2O_3$, 0.5-8 wt.-% $Ho_2O_3$, and 0.00-0.05 wt.-% NiO, and methods of making the same.

15 Claims, 9 Drawing Sheets

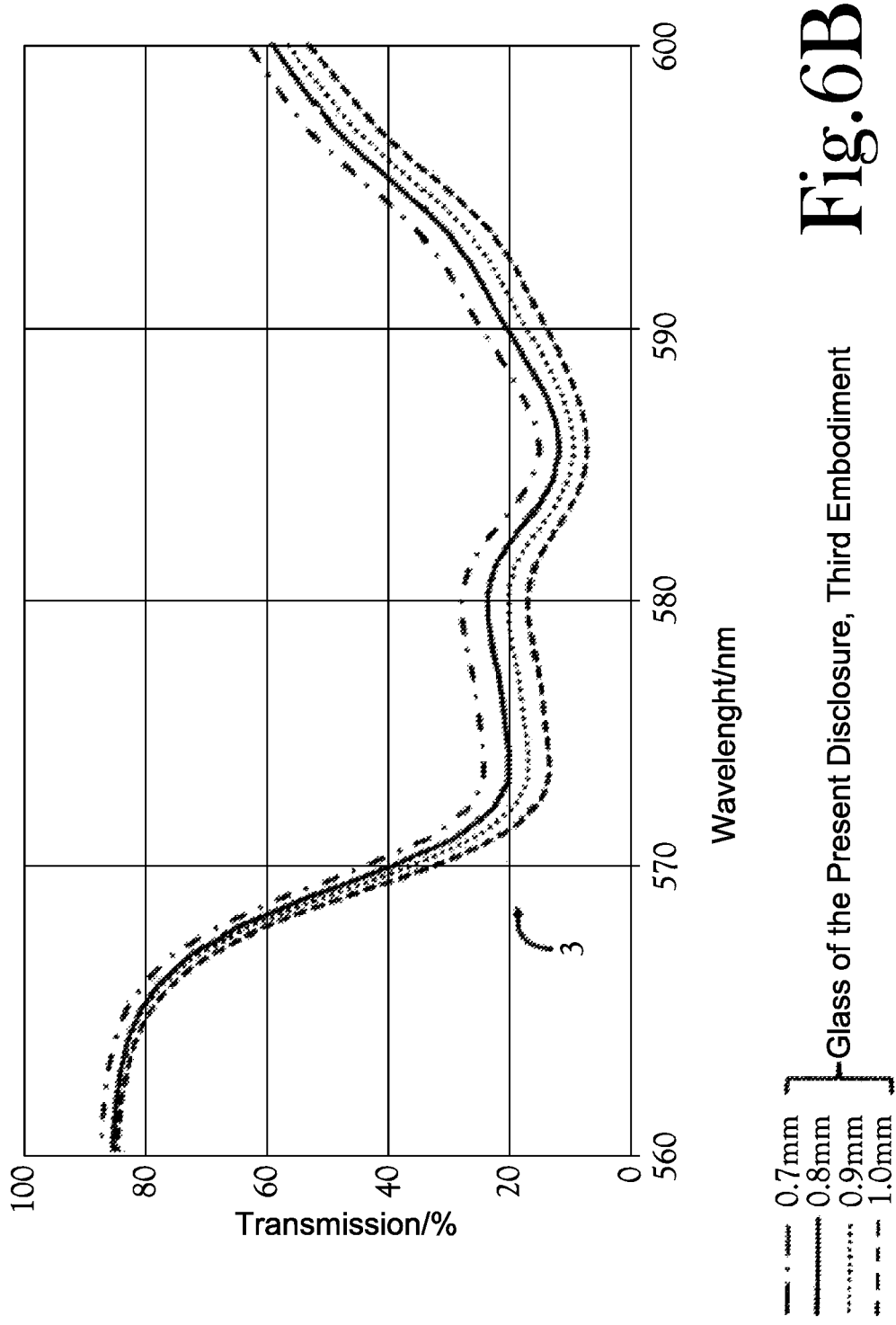

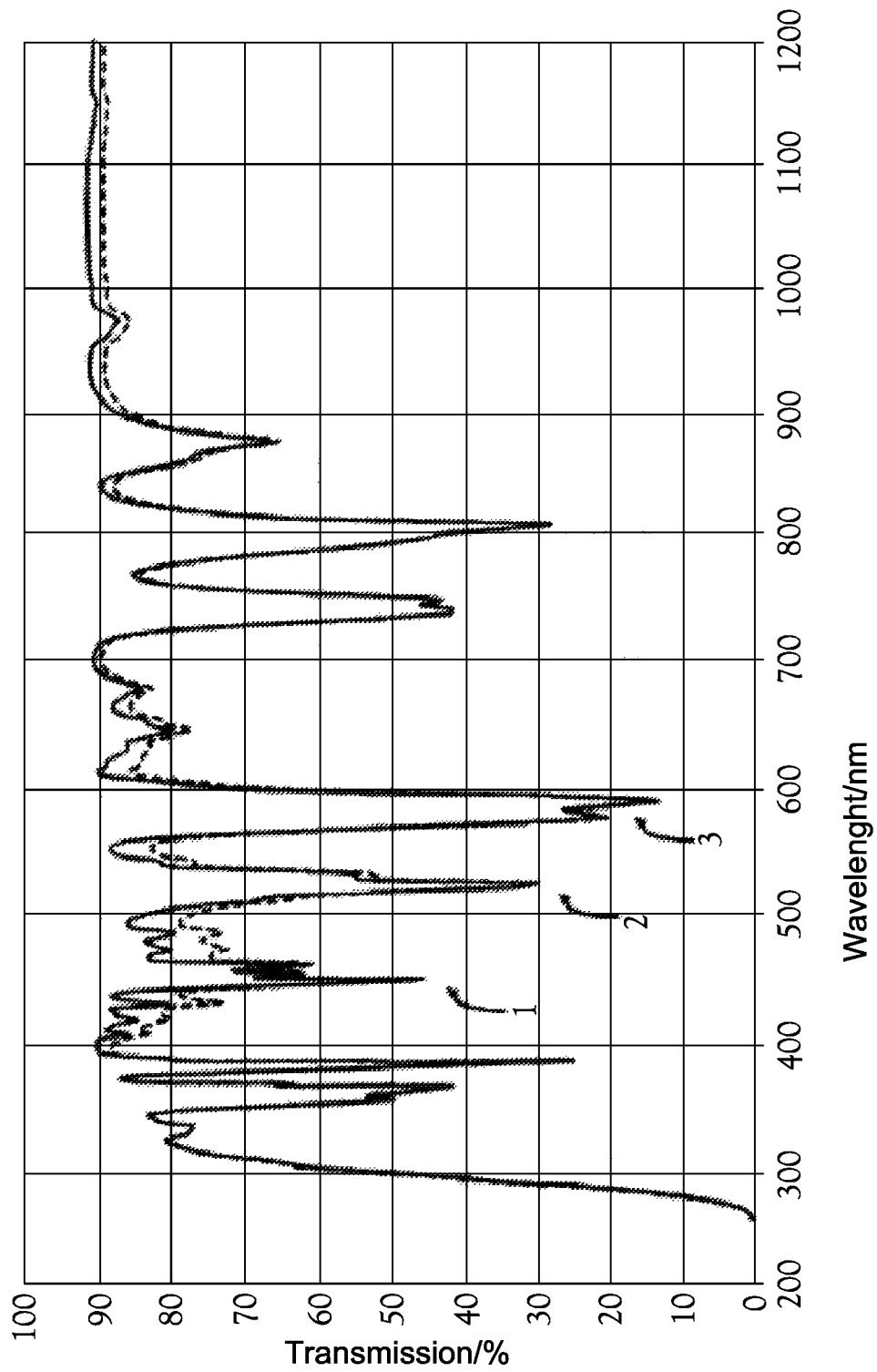

CONTRAST ENHANCING GLASS FOR SUNGLASS LENSES

CROSS-REFERENCE TO RELATED APPLICATIONS

This application claims priority from PCT Application No. EP2019/057915 filed on Mar. 28, 2019, DE Application No. EP18168477.0 filed on Apr. 20, 2018, and U.S. Provisional Application No. 62/660,453 filed on Apr. 20, 2018, the contents of which are all incorporated by reference herein in their entirety.

FIELD OF INVENTION

The invention relates to a glass composition and a method of making the same. More particularly, this invention addresses contrast enhancing glasses. Such glasses can be used for sunglass lenses.

BACKGROUND

Sunglasses are used to protect the human eye against excessive solar radiation, to reduce eye strain and by this to increase visual comfort. It is desired that sunglasses filter UV-radiation, which can be harmful to the eye, preferably up to 400 nm.

One possible way to achieve the UV-protection is due to absorption, for example by adding colouring compounds comprising iron, copper or vanadium. Often those lenses have lower transmission values in the visible spectral range.

Another way to achieve UV-protection is to laminate two lenses and to use e.g. an adhesive layer/glue, which comprises a UV-filter. The UV-filter then absorbs the UV-radiation up to 400 nm.

Principally tinted sunglasses are classified into filter categories 1 to 4. Glasses of filter category 1 show a transmission of more than 43% in the visible spectral range from 380 to 780 nm. Glasses of filter category 4 have a transmission of less than 8% and are not suitable for driving.

In DE patent No. 10 2015 224 374 B3 a thin grey glass is described, which can be used for laminated sunglass lenses. For the composition an exemplary embodiment is given in which about 5 wt.-% neodymium oxide and holmium oxide are used. The aluminoborosilicate base glass comprises additionally copper and bromide. The glass necessarily contains copper with an amount of at least 0.5 wt.-%. The CuBr has to be activated by a tempering process to be able to absorb the radiation in the wavelength region up to 410 nm (including UV radiation). The production of such glasses is more complicated because no easy cooling-programs can be used. A disadvantage of the glass according to DE 10 2015 224 374 B3 is the less pronounced contrast enhancement for red and green. Furthermore the holmium oxide is a very expensive rare earth material. Concentrations of about 5 wt.-% will increase the price of the final product.

According to the U.S. Pat. No. 9,671,622 B1 a lens is provided which is able to increase the optical contrast and colour perception. According to the presented method the lens consists of two laminated lens elements, in which at least one lens element is contrast enhancing. The transmission profile of that lens element is referred to being tetra-chromatic, meaning it has four transmission maxima between 400 to 700 nm. Using appropriate adhesive layers in the lamination process, the lens can offer UV-protection which is at least sufficient to meet the ANSI norm, Z80.3-2001. In the range from 430 to 480 nm several absorption bands are prominent.

U.S. Pat. No. 9,740,028 B1 shows a lens which is contrast enhancing and offers UV-protection at least up to 400 nm. The only absorption bands are at 500 and/or 580 nm. The contrast enhancement is achieved by a glass wafer comprising of rare earth materials. The contrast can be even further enhanced by wavelength-selective organic dyes. The rare earth materials in the glass wafer can be praseodymium oxide, erbium oxide and/or neodymium oxide. To obtain a clear UV-edge above 400 nm copper halide and/or a copper indium combination could be used.

Another option is to solely use organic dyes to reach the functional attributes and in the case of plastic lenses those dyes can be incorporated in the plastic material.

U.S. Pat. No. 4,769,347 A shows glass compositions for contrast enhancing glasses for filters for CRT displays, used e.g. as TV tubes in the past. A high concentration of neodymium oxide (10 to 25%) is mandatory. Beside neodymium oxide, erbium oxide is used and partly samarium oxide. As colouring elements copper oxide and manganese oxide are disclosed. By the addition of cerium oxide and titanium oxide the UV-radiation can be controlled. No filter thickness or transmission values are mentioned in the patent. Also this glass comprises at minimum 10 wt.-% of $Nd_2O_3$. Depending on the thickness of the glass a high amount of $Nd_2O_3$ can be problematical because of its main absorption peak at about 585 nm. The international norms for sunglass lenses demand that at least 20% of the total light transmission is visible between 475 to 650 nm. Additionally, amounts of above 5 wt.-% $Er_2O_3$ are excluded in this patent in contrast to the inventive glass. The reason for this limitation was then caused apparently by the too high manufacturing costs. Unfortunately, in U.S. Pat. No. 4,769,347 A nothing is described with regard to spectra of the visible spectral range and especially the total light transmission. The transmission values stated for a thickness of 3.5 mm include only the wavelengths 445 nm, 555 nm or 618 nm and not the main absorption band at 585 nm. It is obvious that a glass with such a high amount of $Nd_2O_3$ has either a very low visible light transmission or can only be used as a glass for sunglass lenses if it is very thin. Coloured coatings which would lower the transmission further can hardly be used. Furthermore the glass described in U.S. Pat. No. 4,769,347 A is used for a different purpose, e.g. for displays or as a filter glass. The glass made known from U.S. Pat. No. 4,769,347 A is free of $Ho_2O_3$.

From U.S. Pat. No. 6,498,118 B1 a grey glass composition is known that uses iron oxide, erbium oxide and holmium oxide. The resulting glass has a low transmission in the UV- and IR-area and a high visible light transmission. In the patent is mentioned that holmium oxide is acting as a yellow colouring agent. The base glass can be a soda-lime glass or a borosilicate glass. The resulting coloured glasses can be used for car shield windows. U.S. Pat. No. 6,498,118 B1 does not relate to sun protection glasses or sunglass lenses. The glass does not contain any neodymium oxide or nickel oxide, only iron oxide and erbium oxide.

In U.S. Pat. No. 8,210,678 B1 a sunglass lens with contrast enhancement which provides high transmission values in the red, green and blue visible spectral range is presented. The glass is blocking at the same time UV-radiation. The glass can comprise neodymium oxide, praseodymium oxide and erbium oxide. No definite glass composition is given, only the usage of copper halide or a copper-indium compound is mentioned. According to U.S.

Pat. No. 8,210,678 B1, the glasses are heat-treated after the production process (melting and forming) in order to receive the UV-properties. In case plastic lenses are used, dyes are included in their composition. In U.S. Pat. No. 8,210,678 B1 in contrast to the inventive glass there are several absorption bands in the range of 400 to 500 nm. These are caused by the utilized praseodymium oxide.

According to U.S. Pat. No. 5,061,659 A contrast enhancing filter glasses for CRT displays comprising of neodymium oxide, lanthanum oxide and partly erbium oxide are described. When these glasses were melted, they are bluish-grey in colour. The used colouring elements of the glass are a mixture of copper oxide, cobalt oxide, manganese oxide and vanadium oxide whereby chromium oxide can be included. Cerium and titanium oxide are combined in the glasses to decrease UV-transmission. U.S. Pat. No. 5,061,659 A does not show a transmission spectrum and transmission values are only given for certain wavelengths, not for the whole visible spectral range.

U.S. Pat. No. 5,190,896 A is stating compositions for contrast enhancing glasses, especially for sunglass lenses. Therefore, neodymium oxide is used in concentrations between 5 to 17 wt.-%. Erbium oxide can be added to support the contrast enhancement. To suppress most of the UV-radiation, cerium oxide and titanium oxide in combination with iron oxide are used. Additionally, the glass can comprise colouring elements like copper oxide, cobalt oxide, nickel oxide, vanadium oxide and chromium oxide. Preferred colours are grey or brown. A refining agent can be added, e.g. $KHF_2$. The glasses of U.S. Pat. No. 5,190,896 A show transmission values between 15 to 30%. Apparently, the high amount of contrast enhancing components as well as the colouring elements strongly reduce the transmission in the visible spectral range, so that at the target thickness the glasses belong to filter category 2 or 3.

In U.S. Pat. No. 8,733,929 B2 a sunglass lens is described which is made out of a lens body and a multilayer-coating. The final lens is contrast enhancing. The transmission profile of the coated glass has three main absorption bands. Whereas the addition of the contrast enhancing components is mentioned in the patent, neither a specific composition is listed nor the thickness or filter category are stated.

WO application WO 2007/021 432 A2 shows a soda-lime-silica glass for car windows or for architectural applications. The preferred colour is grey, as colouring elements erbium oxide, praseodymium oxide, neodymium oxide, cobalt oxide, nickel oxide and/or iron oxide have been used. The preferred glass thickness is about 3-4 mm and the glass has a transmission in the visible spectral range above 55%. When included, the rare earth materials each have a maximum concentration of 1%, so that they are not acting contrast enhancing but to modify the colour and influence the transmission values.

From the WO application WO 2014/024 065 A1 a method to produce coloured laminated glass lenses for eyeglasses is known. The colour is partly reached by lacquering and coating of at least one of the glued surfaces of the lens elements. The glasses can contain rare earth materials, e.g. neodymium oxide to enhance the eyeglass colour contrast. To reach UV-protection, an appropriate glue can be used which constitutes a UV-filter. Whereas UV-protection in the glass itself is helpful, it is sufficient if reached by a laminated lens due to adhesive layers. Lamination processes to achieve UV-protection are state of the art, e.g. described in U.S. Pat. No. 9,671,622 B1.

From EP 2074070 B1 and from EP 1918259 A1 contrast enhancing UV-absorbing glasses and articles containing the same have made known. Principally the UV-protection is obtained by the precipitation of cuprous halide crystals (CuX) and a tempering step during the production process. Therefore the presence of copper and one or several halides and a tempering step are mandatory. Most of the glasses shown in table I contain copper and bromine. To obtain UV-protection by heat treatments, temperatures sometimes higher than 620° C. were used. Additionally, praseodymium oxide was included which in contrast to the inventive glass causes several absorption bands in the range of 400 to 500 nm. According to table II, some glasses for which the visible transmission values at a thickness of 1 mm are stated do not seem to meet the international standards for sunglass lenses with regard to the minimum transmission (between 475 to 650 nm). However, explicit target or minimum transmission values are not stated in the patent. The glasses from table I do not contain the triple combination of $Nd_2O_3$ and NiO and $Er_2O_3$ in contrast to the inventive glass. Moreover, the glass compositions of EP 2074070 B1 and EP 1918259 A1 are free from $Ho_2O_3$. Also the addition of zirconia with a minimum of 2 wt.-% and aluminia with at least 3 wt.-% is required. The glasses within their scope of invention all include a higher concentration of boron oxide. It is state of the art to add high concentrations of $B_2O_3$, e.g. 12-25 wt.-%, to support the formation and precipitation of the cuprous halide crystals in the glass.

Furthermore the three exemplified glasses which are within their scope of invention are a lot more yellow-greenish in comparison to the inventive glasses

BRIEF SUMMARY

An object of the invention is to overcome the disadvantages of the prior art and to present a glass composition especially a contrast enhancing glass and a method of making the same.

Example embodiments of the present general inventive concept can be achieved by a glass composition, including contrast enhancing glass and contrast enhancing sunglass, having approximately 45-65 wt.-%, $SiO_2$, 0-12 wt.-% $B_2O_3$, 0-15 wt.-%, $Na_2O$, 0-10 wt.-% $K_2O$, and 10 0-7 wt.-% ZnO, 1-12 wt.-% $Nd_2O_3$, 1-10 wt.-% $Er_2O_3$, 0.5-8 wt.-% $Ho_2O_3$, and 0.00-0.05 wt.-% NiO, and methods of making the same.

Additional features and embodiments of the present general inventive concept will be set forth in part in the description which follows and, in part, will be obvious from the description, or may be learned by practice of the present general inventive concept.

BRIEF DESCRIPTION OF THE DRAWINGS

The following example embodiments are representative of example techniques and structures designed to carry out the features of the present general inventive concept, but the present general inventive concept is not limited to these example embodiments. Moreover, in the accompanying drawings and illustrations, the sizes and relative sizes, shapes, and qualities of lines, entities, and regions may be exaggerated for clarity. A wide variety of additional embodiments will be more readily understood and appreciated through the following detailed description of the example embodiments, with reference to the accompanying drawings in which the drawings show:

FIG. 6b shows the transmission of glasses as shown in FIG. 6a in the wavelength range of 560 nm to 600 nm;

FIG. 7 shows a comparison of the transmission spectra between a 0.9 mm thick glass element of the first and a fourth embodiment of a glass composition according to the invention.

DETAILED DESCRIPTION

Figure 1:
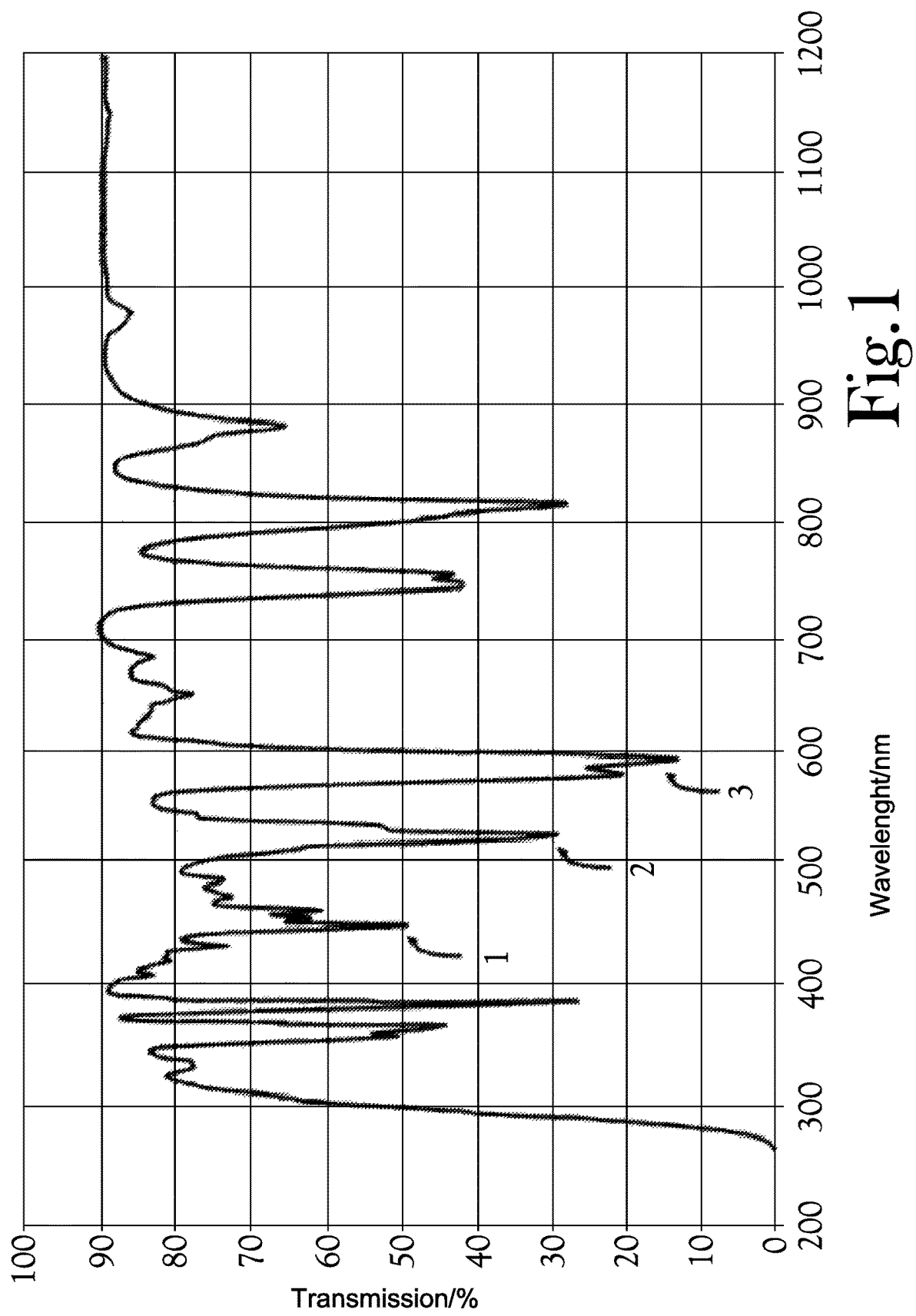
FIG. 1 shows the transmission spectrum of a first embodiment of a glass composition according to the invention with a thickness of about 0.9 mm.

Reference will now be made to example embodiments of the present general inventive concept, examples of which are illustrated in the accompanying drawings and illustrations. The example embodiments are described herein in order to explain the present general inventive concept by referring to the figures.

Embodiments of the present general inventive concept describe a sunglass which is contrast enhancing and shows a distinct transmission profile with absorption bands at about 450 nm, 520 nm and 585 nm. Therefore light is absorbed in the blue, green and yellow region of the visible spectral range. Additionally the glass has a visible light transmission of at least 60% at nominal thicknesses. The glass contains as few components as possible and is easy to melt.

Contrast enhancement obtained by coating is less stable in comparison to a glass containing rare earth elements. The object of the invention is solved by glass and process embodiments as described herein.

For example, a glass composition, especially a contrast enhancing glass, preferably a contrast enhancing sunglass comprising 45-65 wt.-%, preferably 50-60 wt.-% $SiO_2$
0-12 wt.-%, preferably 5-10 wt.-% $B_2O_3$
0-15 wt.-%, preferably 5-15 wt.-% $Na_2O$
0-10 wt.-%, preferably 1-5 wt.-% $K_2O$
0-7 wt.-%, preferably 1-5 wt.-% ZnO,
characterized in that the glass composition further comprises:
1-12 wt.-%, preferably 5-11 wt.-% $Nd_2O_3$, most preferred 6-10 wt.-% $Nd_2O_3$
1-10 wt.-%, preferably 5-7 wt.-% $Er_2O_3$
0.5-8 wt.-%, preferably 1-5 wt.-% $Ho_2O_3$
0.00-0.05 wt.-%, preferably 0.01-0.04 wt.-%, especially 0.02-0.04 wt.-% NiO.

Glasses without copper and bromine show melting advantages, especially as higher amounts of cullets or glass powder can be used without changing the important transmission properties. A further advantage is a less strict glass composition as for the formation and precipitation of copper and/or cuprous halides certain amounts of other components, such as boron oxide are required. The used lower concentrations of boron oxide help to improve the meltability of glasses. Opposed to that, high concentrations of boron oxide can decrease the glass stability and can be harmful to the tank material.

Another advantage of glasses without copper is that they can be produced without a tempering step, since in order to activate copper and/or halides tempering is necessary. The inventive glasses without copper could therefore be processed in a conventional cooling process. The inventive glasses are very good meltable, a high amount of cullets could be used in the melt and the cooling process is not complicated.

In particular the inventive glass composition used as contrast enhancing glass has a slight bluish to pale purple colouration, preferably neutral in colour but is not limited to it. With thicknesses between 0.7 and 1.0 mm the inventive glass relates to the filter category 1 and barely distorts natural colours. The inventive glass can be used for laminated lenses made of thin glasses.

The base glass of the inventive glass composition comprises at least the following components:
45-65 wt.-%, preferably 50-60 wt.-% $SiO_2$
0-12 wt.-%, preferably 5-10 wt.-% $B_2O_3$
0-15 wt.-%, preferably 5-15 wt.-% $Na_2O$
0-10 wt.-%, preferably 1-5 wt.-% $K_2O$
0-7 wt.-%, preferably 1-5 wt.-% ZnO,
but is not limited to it. Other glass components such as $TiO_2$, $ZrO_2$, BaO or $Li_2O$ can be used to improve the durability or to adjust the refractive index in typical concentrations between 0.1 to 5 wt.-%. If the used concentrations of $ZrO_2$ and/or $TiO_2$ are too high, the phase separation and crystallisation tendency increase. Therefore a maximum content of $ZrO_2$ and/or $TiO_2$ should not exceed 5 wt.-%. A preferred range is between 0.1 wt.-% to 1.0 wt.-%, especially 0.1 wt.-% to 0.5 wt. %.

It is possible to add $Al_2O_3$ to the glass in concentrations between 0 to 8 wt.-%, preferably 1 to 8 wt.-%, especially preferred 1 to 5 wt.-%, especially 2 to 5 wt.-%. By using $Al_2O_3$ in low amounts, if necessary, the glass stability can be improved. Too high alumina contents can lead to melting problems.

According to the inventive concept the base glass, which is e.g. a borosilicate glass but not limited to it, comprises at least of the following colouring and contrast enhancing components:
1-12 wt.-%, preferably 5-11 wt.-% $Nd_2O_3$
1-10 wt.-%, preferably 5-7 wt.-% $Er_2O_3$
0.5-8 wt.-%, preferably 1-5 wt.-% $Ho_2O_3$ Furthermore, the inventive glass comprises nickel oxide acting as mainly but not only as colouring agent. According to the invention, the nickel oxide is used to support the absorption maximum of holmium oxide and balance the colour resulting from the incorporation of neodymium oxide and erbium oxide. The glass can comprise 0.01-0.05 wt.-%, preferably 0.01-0.04 wt.-%, especially 0.02-0.04 wt.-% NiO. In combination with $Ho_2O_3$, NiO provides for a more neutral colour in comparison to the glasses disclosed in EP 1918259 A1.

Additionally, the glass can comprise the contrast enhancing rare earth material praseodymium oxide in the following concentration:
0-8 wt.-%, preferably 0-5 wt.-% $Pr_6O_{11}$ Praseodymium oxide is acting as a colour filter and in higher amounts as a green colouring agent. It has transmission bands in a broader but overlapping range as holmium oxide and can be used to adjust to colour and to support the absorption and contrast enhancement due to holmium oxide.

By the addition of $Pr_6O_{11}$ the absorption in the wavelength range between 430 and 480 nm due to holmium oxide is increased.

The inventive glass contains $Er_2O_3$ with the main absorption band at about 520 nm. The absorption band at 520 nm masks the absorption of the neodymium oxide and provides for an absorption in the blue-green area. Further the inventive glass contains a lower amount of $Ho_2O_3$ then the embodiments shown in DE 10 2015 224 374 B3. Further the inventive glass in contrast to the glass in DE 10 2015 224 374 B3 contains NiO in an amount of 0.01-0.05 wt.-%, preferably more than 0.02 wt.-% NiO. The use of NiO adjusts the colour and decreases the transmission partly in the same wavelength range as $Ho_2O_3$. Therefore by using NiO the amount of $Ho_2O_3$ can be lowered without negative effects with regard to colour and transmission. Using NiO saves $Ho_2O_3$ which is very costly. On the other side the amount of NiO should not exceed 0.05 wt.-% because the glass in such a case becomes darker and less transparent.

Beside neodymium oxide, erbium oxide, holmium oxide or praseodymium oxide, rare earth materials such as $CeO_2$, $La_2O_3$ or $Nb_2O_5$ between 0.1 to 2 wt.-% in the glass can be included without affecting the contrast enhancement. $CeO_2$ is an oxidizing agent, which can shift the UV-edge of the transmission spectrum mainly below a wavelength of 400 nm. This means, in lower concentrations $CeO_2$ does not affect the visible spectral range. In high concentrations $CeO_2$ can influence the colour values. Moreover $CeO_2$ is also acting as a refining agent.

$La_2O_3$ and $Nb_2O_5$ have no effect on the transmission spectrum of the invented glass and can be used to influence other glass properties, e.g. to increase the refractive index.

The inventive composition can not only be used as a contrast enhancing dichroic glass which, depending on the light condition, is e.g. grey (electrical light) or pale bluish-purple (daylight) in colour but furthermore has three main absorption bands in the range between 400 to 600 nm whereas the highest absorption is visible at about 585 nm.

One of the rare earth materials used is neodymium oxide ($Nd_2O_3$). Neodymium oxide has the main interference at about 585 nm. Because it absorbs most of the yellow light, it is known to enhance the contrast between red and green. Used in high concentrations as in the invention $Nd_2O_3$ is another colouring agent, especially as it is highly dichroitic as well. Under electrical/fluorescent light the glass colour is bluish, in daylight it is lavender to purple. In the inventive glass less than 12 wt.-% $Nd_2O_3$, preferably between 5 wt.-% and 11 wt.-%, especially between 5 wt.-% and 10 wt.-% $Nd_2O_3$ is sufficient to reach high absorption intensities in contrast to U.S. Pat. No. 4,769,347 A.

Holmium oxide is acting as a yellow colouring agent. Holmium oxide has its main interferences at about 450 nm and absorbs in the violet to blue visible wavelengths. Thus $Ho_2O_3$ acts contrast enhancing, if it is used in concentrations higher than 0.5 wt.-%. The shape and the position of the absorption maximum depend on the composition, especially when several rare earth materials are used an overlapping of the different absorption bands occurs. In one embodiment of the invention the absorption maximum is at 446 nm, close to the literature stated maximum of 445 nm. Holmium oxide helps to shift the colour that results by the addition of neodymium oxide and erbium oxide. Because of the sharp absorption profile of holmium oxide, glasses containing holmium oxide can be used as filter glasses, e.g. for calibration, to check the wavelength accuracy of a spectralphotometer respectively.

The third used contrast enhancing rare earth material is erbium oxide which has its main absorption in the blue-green to green part of the visible spectral range, at about 521 nm. Erbium oxide shifts the glass colour to a pinkish-red and changes the appearance of the absorption bands caused by neodymium oxide. The weaker absorption interferences caused by neodymium oxide at about 513 and 529 nm are only visible as shoulders left and right from the main interference of erbium oxide at 520 nm, e.g. visible in FIG. 1 in the second interference 2. The inventive glass contains preferably an amount of more than 5 wt.-% $Er_2O_3$.

The colouring agent nickel oxide can be added to get a more neutral colour impression. The main absorption of nickel oxide in the visible spectral range is between 400 to 600 nm, especially in the range of 400 to 500 nm. When nickel oxide is included, the resulting colour of the glass depends on the base glass composition and it can be yellowish, brown or even purple. Because of the broad absorption the nickel oxide concentration has to be balanced in a way that it supports the absorption of holmium oxide (main absorption at about 446 nm) but does not lower the visible transmission to values lower than 60% in the visible spectral range from 380 nm to 780 nm. In order to achieve a high transmission, the nickel oxide content is lower 0.1 wt.-%, especially lower than 0.05 wt.-%.

Praseodymium oxide can be included to increase the absorption and contrast enhancement especially in the range between 430 to 480 nm. Praseodymium oxide can support the interference 1 visible in FIG. 1 due to holmium oxide in the invented glass composition. In higher concentrations $Pr_6O_{11}$ is acting as a green colouring agent.

To shift the colour, other colouring agents such as copper oxide (bluish-green), cobalt oxide (blue), chromium oxide (yellow-green), vanadium oxide (green), iron(III)oxide (yellow-brown) or iron(II)oxide (bluish-green) can be included in the glass composition.

The glass composition of the invention is stable enough that those additions can be included without negatively affecting the glass meltability or pressing parameters.

Beside the previously mentioned components, the glass comprises of certain fluxing and refining agents.

$Sb_2O_3$ is a well-known refining agent and is included in the glass in concentrations between 0.1-3.0 wt.-%, preferably 0.1-1.0 wt.-%. To support the refining process, nitrate in concentrations of 0.1-2.0 wt.-%, preferably 0.5-1.5 wt.-% $NO_3-$ can be added to the glass. Other refining agents such as SnO can be used as well, typically in amounts of 0.5 to 1.0 wt.-%.

Additionally, chlorine ($Cl^-$) can be used in concentrations of 0-0.5 wt.-%, preferably 0.1-0.5 wt.-%, most preferred 0.2-0.4 wt.-%.

If the glass composition according to the invention is used as a sunglass, such a glass has a visible transmission (between 380 and 780 nm) of more than 60% at a thickness of 0.9 mm (see FIG. 1). Beside the high transmission of at least 60% for a glass thickness of 0.9 mm in the visible spectral range (380 nm to 780 nm) the inventive glass is easily meltable and has an easy cooling regime. The measurement of the transmission was carried out on polished sample with CIE illuminant D65 with a 2° observer between 380 and 780 nm, with respect to ISOs 12312-1:2013, 11664-1:2007 and 11664-2:2007. The glass shows three main interferences between 400 and 600 nm. Their intensities depend on the thickness of the prepared glass. At 0.9 mm thickness the first interference of a polished lens of the invented composition is between 430 and 470 nm. The interference appears with the highest absorption value at about 446 nm having a transmission between 48 to 52%. The second absorption band is in the wavelength range of 510 and 540 nm, with the maximum absorption at 521 nm having a transmission of 27 to 32%. The third absorption maximum is between 570 and 600 nm with the maximum absorption at 585 nm and has a transmission value of higher than 12%.

The glass material of the invention is melted by a continuous tank melt and is pressed into blanks with a thickness of about 3 mm. An advantage of the inventive compositions is that during the melting procedure a high amount of suitable glass cullets or glass powder can be used. Since no tempering is necessary the cooling procedure is easy.

The blanks are cooled down according to a given annealing process. Afterwards the blanks have to be processed, e.g. the blanks can be grinded, lapped and polished to the requested thickness, e.g. 0.9 mm.

Even though the glasses of this invention are produced by direct pressing the production process is not limited to it. Freeform pressing and reshaping to a desired form is possible as well as any other method.

The invention further discloses a lens made of two lens elements in which at least one lens element comprises a glass composition according to the invention comprising at least the rare earth materials neodymium oxide, erbium oxide and holmium oxide. This first lens element is adhered to a second lens element preferably by an adhesive layer. This adhesive layer can comprise a glue which is constituting an UV-filter and blocks light below wavelengths up to 400 nm. The second lens element can consist of a mineral glass, e.g. a silica glass or borosilicate glass or it can be a plastic lens. The terms first and second lens element are only used to differ between different components of the final lens and not to imply the order of front and rear lens element.

When laminated as described above, the glass composition can be used for ophthalmic application, e.g. for sunglass lenses. When laminated, the glass of the inventive composition is increasing the colour perception and thereby improving the wearers comfort.

For the lamination processes, in order to prepare assembled lenses, techniques which are already known as state of the art, as mentioned in U.S. Pat. No. 9,671,622 B1, in U.S. Pat. No. 9,740,028 B1, in U.S. Pat. No. 8,733,929 B2 and in WO patent application No. 2014/024 065 A1 are used.

FIG. 1 shows the transmission spectrum of a first embodiment of a glass composition according to the invention with a thickness of about 0.9 mm.

Apart from the inventive components the glass comprises as base glass components:
45-65 wt.-%, preferably 50-60 wt.-% $SiO_2$
0-12 wt.-%, preferably 5-10 wt.-% $B_2O_3$
0-15 wt.-%, preferably 5-15 wt.-%
$Na_2O$ 0-10 wt.-%, preferably 1-5 wt.-% $K_2O$
0-7 wt.-%, preferably 1-5 wt.-% ZnO The glass composition according to FIG. 1 in a first embodiment comprises in weight percent:
57.10 wt.-% $SiO_2$
8.00 wt.-% $B_2O_3$
12.40 wt.-% $Na_2O$
3.00 wt.-% $K_2O$
3.30 wt.-% ZnO
8.30 wt.-% $Nd_2O_3$
5.30 wt.-% $Er_2O_3$
2.00 wt.-% $Ho_2O_3$
0.30 wt.-% $Sb_2O_3$
0.27 wt.-% $Cl^-$
0.04 wt.-% NiO The glass composition according to the first embodiment with a thickness of 0.9 mm has a transmission value of 61% in the visible spectral range. The first absorption maximum 1 at 446 nm has a value of about 50.0%, the second absorption maximum 2 at 521 nm has a value of about 30.0% and the third absorption maximum 3 at 585 nm of about 13.5%.

The glass of this first embodiment is melted by a continuous tank melt and is pressed afterwards to blanks. Typically, those blanks have a thickness of about 3 mm. After the production the cooled blanks are processed, e.g. milled, lapped, grinded and polished. In particular by these processes, glasses of a desired layer thickness can be obtained. The thicknesses of the glasses obtained from the blanks are for example in the range of 0.7 mm to 1.0 mm.

The transmission behaviour of a glass with a thickness of 0.9 mm with the before stated composition according to the first embodiment of the invention is demonstrated in FIG. 1. The total transmission according to FIG. 1 in the visible spectral range between 380 to 780 nm is about 61%.

Furthermore, the transmission spectrum in FIG. 1 shows three main interferences denoted with reference numbers 1, 2 and 3 at about 446 nm, 521 nm and 585 nm.

The first transmission minimum 1 at 446 nm is generated by the addition of $Ho_2O_3$ and promoted by the addition of nickel oxide. For the disclosed glass the value is between 45 and 55%, but preferably below 52%.

The second interference 2 at 521 nm is due to the addition of erbium oxide. As $Er_2O_3$ is used in high amounts, erbium oxide is acting as a colouring agent (pinkish-red). The transmission is preferably below 32%.

The third transmission minimum 3 is visible at a wavelength of 585 nm and is generated by the addition of $Nd_2O_3$. Again, this rare earth when used in concentrations as high as in the first embodiment (>5 wt.-%) is acting additionally as colouring agent. The resulting glass changes the colour depending on the light condition.

The transmission value is below 20% and more preferably below 15%. The minimum value between 475 to 650 nm has to be at least 20% of the transmission in the visible spectral range ($0.2 \cdot \tau_v$) between 380 to 780 nm according to the DIN ISO 12312-1:2013. For the invented glass this would result in a minimum value of least 12.2% and to guarantee the production stability a minimum of 12.5% would be necessary.

The invented glass has an almost neutral colour and comprises at least three rare earth materials, neodymium oxide, erbium oxide and holmium oxide. For example for embodiment 1 of this invention the refractive index is about 1.544; the density is approximately 2.8 g/cm$^3$.

To obtain UV-protection, two lenses can be laminated by processes known to be state of the art. The invented glass according to the embodiment of FIG. 1 has a thickness of 0.9 mm and can be used for such a lamination process mentioned e.g. in U.S. Pat. No. 9,671,622 B1, in U.S. Pat. No. 9,740,028 B1, in U.S. Pat. No. 8,733,929 B2 and in WO patent application 2014/024 065 A1. The content of these applications is introduced into this disclosure by reference. All radiation below 400 nm will be blocked by the glue used for the lamination and results in a UV-protecting sunglass lens.

Additionally, a light-polarizer can be included between the two laminated lens elements. It is possible to laminate the 0.9 mm thin glass according to the invention to a silicate glass body as well as to a photochromic glass or a plastic lens, for example such as used for spectacles. Furthermore, it is possible to add coatings, for example a mirror-coating or antireflective (AR) coatings.

Figure 2:
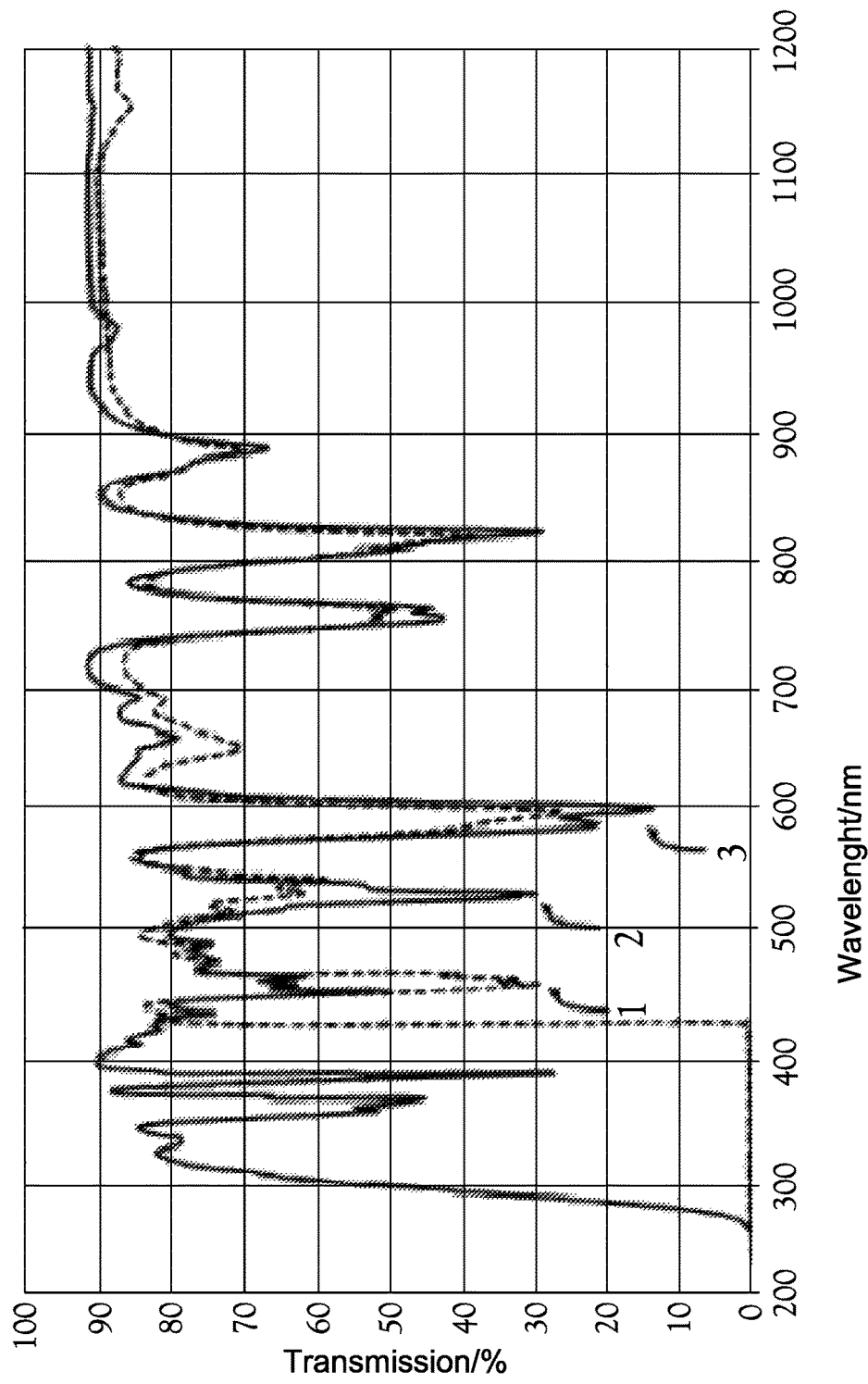
FIG. 2 shows the transmission spectra of a glass composition according to the state of the art in form of DE 10 2015 224 374 B3 in comparison to the inventive composition.

In FIG. 2 the transmission spectrum of a glass with the composition as disclosed in DE patent No. 10 2015 224 374 B3, with a thickness of 0.9 mm is compared to a transmission spectrum of a glass according to embodiment 1 of the invention with the same thickness. It is obvious that the transmission profiles of both glasses are different. The glass according to DE 10 2015 224 374 B3 has a UV-edge whereas the glass of the present disclosure can offer UV-protection only when laminated accordingly. The contrast between red and green is more enhanced for the inventive glasses, the difference of the minimum transmission of the inventive glass compared to the glass which is known from DE 10 2015 224 374 B3 at 585 nm is in total about 10 to 13%. Since only two rare earth elements are used in the embodiment of the DE 10 2015 224 374 B3, the main absorption at 521 nm caused by erbium oxide in the invention does not exist in the transmission spectra of DE 10 2015 224 374 B3. The glass according to the invention has a transmission of more than 60% in the visible spectral range for a 0.9 mm thick glass panel. The glass shown in DE 10 2015 224 374 B3 comprises in sum a much lower amount of rare earth elements and a totally different transmission profile. The rare earth elements in DE 10 2015 224 374 B3 are combined with colouring agents like CoO and NiO and because of their high absorption the transmission of the glass is reduced. Furthermore the lesser main absorption due to neodymium oxide in DE 10 2015 224 374 B3 results in a transmission at 585 nm only as low as 25%. The inventive glass has a minimum transmission due to neodymium oxide as low as 15%. Therefore the inventive glass is much more contrast enhancing then the glass shown in DE 10 2015 224 374 B3. The inventive glass is more contrast enhancing compared to the glasses described in the state of the art. The main $Nd_2O_3$ absorption is denoted with reference number 3 at 585 nm in FIG. 2. In FIG. 2 the main erbium oxide absorption at 521 nm is denoted with reference number 2 and the main holmium oxide absorption at 446 nm is denoted with reference number 1.

Figure 3:
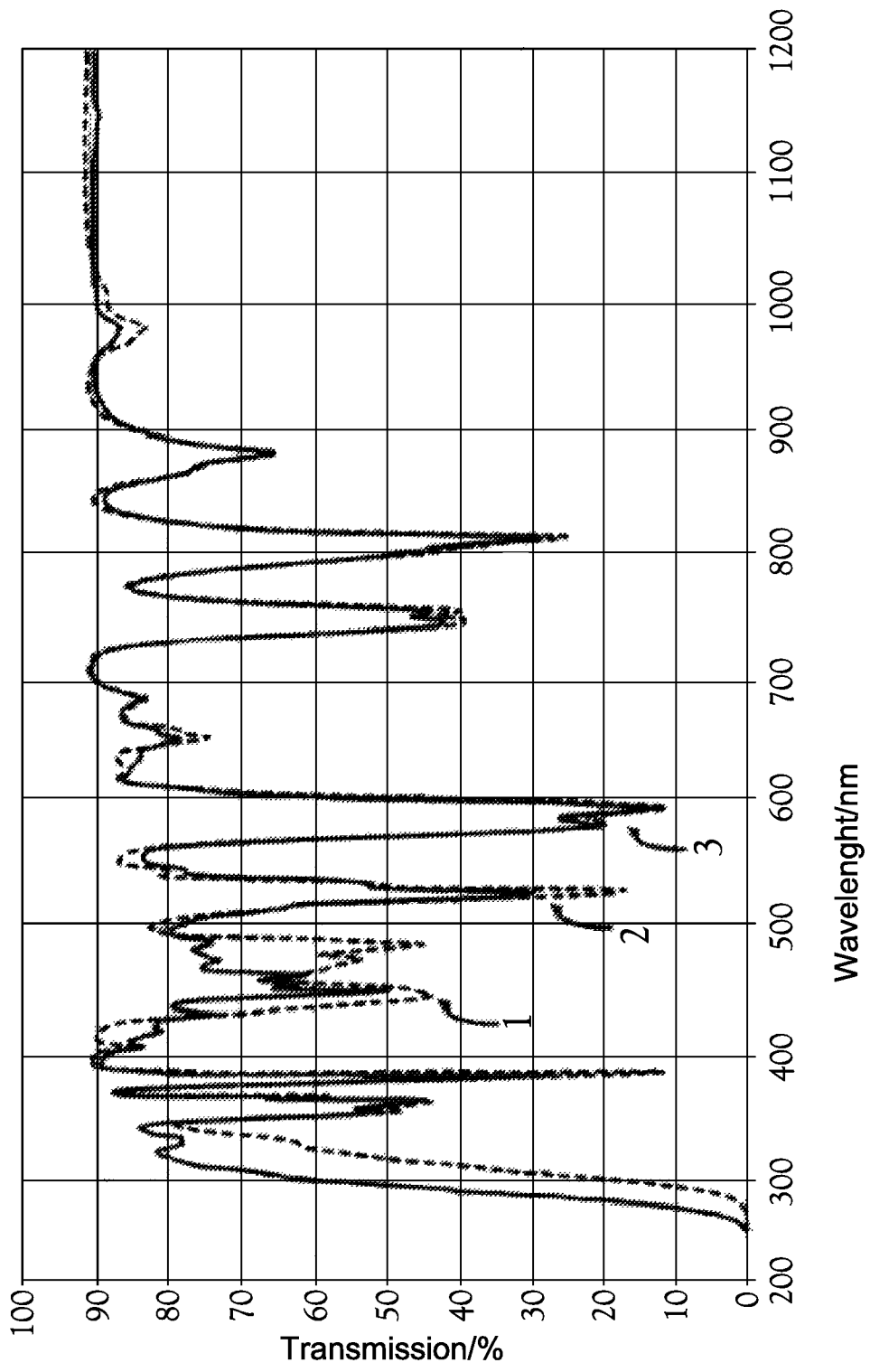
FIG. 3 shows a comparison of transmission spectra between a 0.9 mm thick glass element according to U.S. Pat. No. 9,671,622 B1 and of the invention.

FIG. 3 shows a comparison of the transmission spectra between a glass for a lens element according to U.S. Pat. No. 9,671,622 B1 at 0.9 mm thickness with a glass according to embodiment 1 of the invention of the same thickness. The absorption of the yellow light at 585 nm and therefore the contrast enhancement for red and green is comparable. The absorption at about 450 nm is a bit lower for the inventive disclosure but the absorption is limited to wavelengths between 430 to 470 nm. This enables the glass of the invention to transmit more of the unharmful blue-light between 470 to 500 nm compared to the one from U.S. Pat. No. 9,671,622 B1. The inventive glass in contrast to the glass described in U.S. Pat. No. 9,671,622 B1 can be made thicker, e.g. up to 1 mm, which makes it easier to grind the glass. The glass from U.S. Pat. No. 9,671,622 B1 has to be kept thinner to be able to fulfil the sunglass norms with regard to the minimum peak due to neodymium oxide, between 475 and 650 nm.

Figure 4:
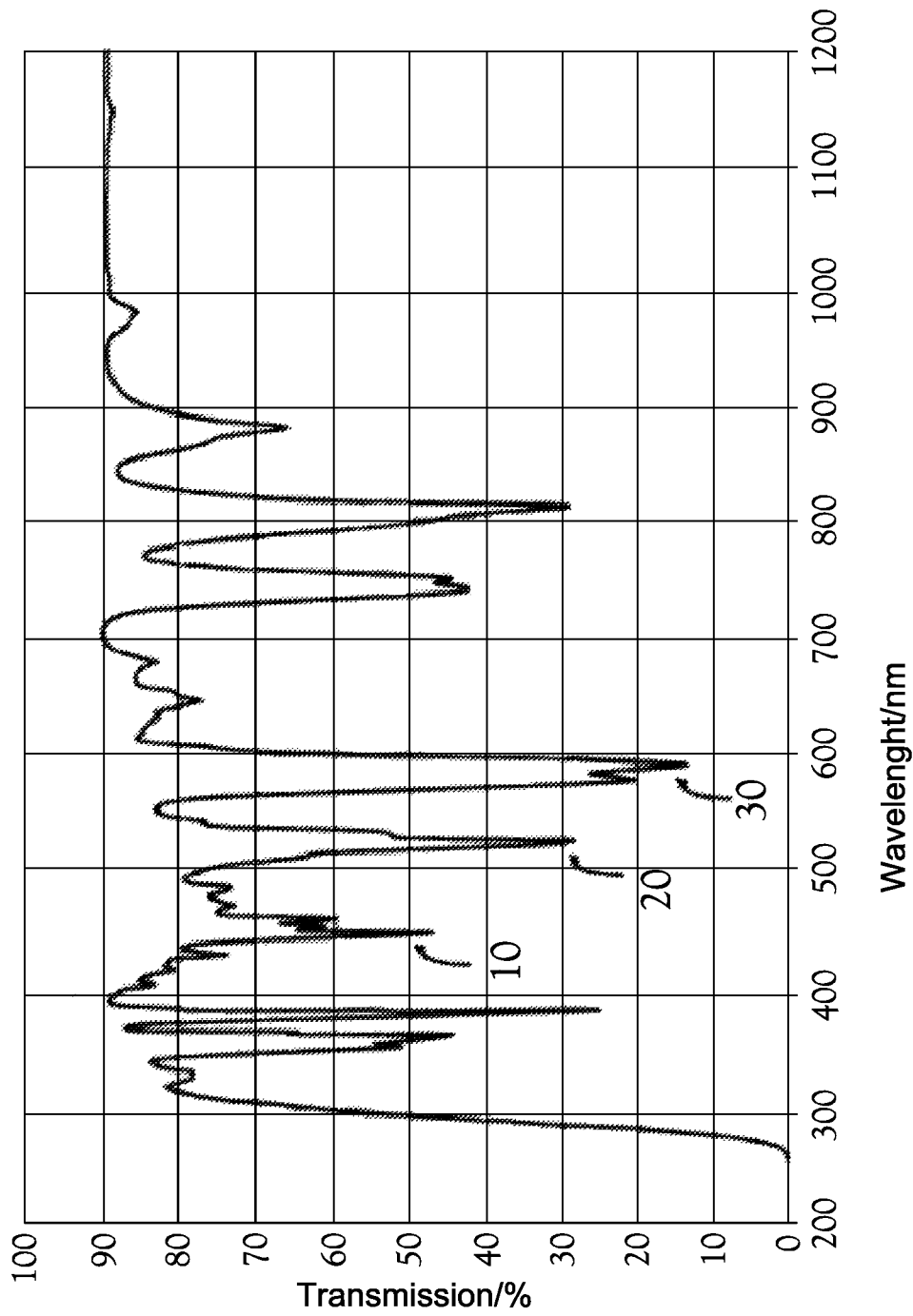
FIG. 4 shows the transmission spectrum of a second embodiment of a glass composition according to the invention with a thickness of about 1.0 mm.

FIG. 4 is the transmission spectrum according to a second embodiment of the invention with an increased thickness of about 1.0 mm.

The second embodiment of the invention comprises in weight percent:
57.50 wt.-% $SiO_2$
8.50 wt.-% $B_2O_3$
12.70 wt.-% $Na_2O$
3.00 wt.-% $K_2O$
3.30 wt.-% $ZnO$
7.40 wt.-% $Nd_2O_3$
5.00 wt.-% $Er_2O_3$
2.00 wt.-% $Ho_2O_3$
0.30 wt.-% $Sb_2O_3$
0.27 wt.-% or $Cl^-$
0.03 wt.-% $NiO$ The glass of the second embodiment has a transmission value of 61% in the visible spectral range. The first absorption maximum 10 at 446 nm has a value of about 47.5%, the second absorption maximum 20 at 521 nm has a value of 29.0% and the third absorption maximum 30 at 585 nm of 13.5%.

For sunglasses a preference of a lower thickness leading to lighter glasses is desired. Depending on the thickness of the glass lens element especially the concentration of the rare earth materials has to be adjusted. If a lens element shall have a thickness of about 0.7 mm without changing the depth of the absorption maxima or the visible transmission, the rare earth elements have to be increased in total about 3 wt.-% in comparison to the first embodiment. This is shown in the third embodiment below.

The third embodiment of the invention comprises in weight percent:
55.20 wt.-% $SiO_2$
7.50 wt.-% $B_2O_3$
12.1 wt.-% $Na_2O$
2.90 wt.-% $K_2O$
3.00 wt.-% $ZnO$
9.70 wt.-% $Nd_2O_3$
6.20 wt.-% $Er_2O_3$
2.80 wt.-% $Ho_2O_3$
0.30 wt.-% $Sb_2O_3$
0.26 wt.-% $Cl^-$
0.04 wt.-% $NiO$ The third embodiment is characterized by higher $Nd_2O_3$, $Er_2O_3$ and $Ho_2O_3$ concentrations in comparison to the first and second embodiment.

Figure 5:
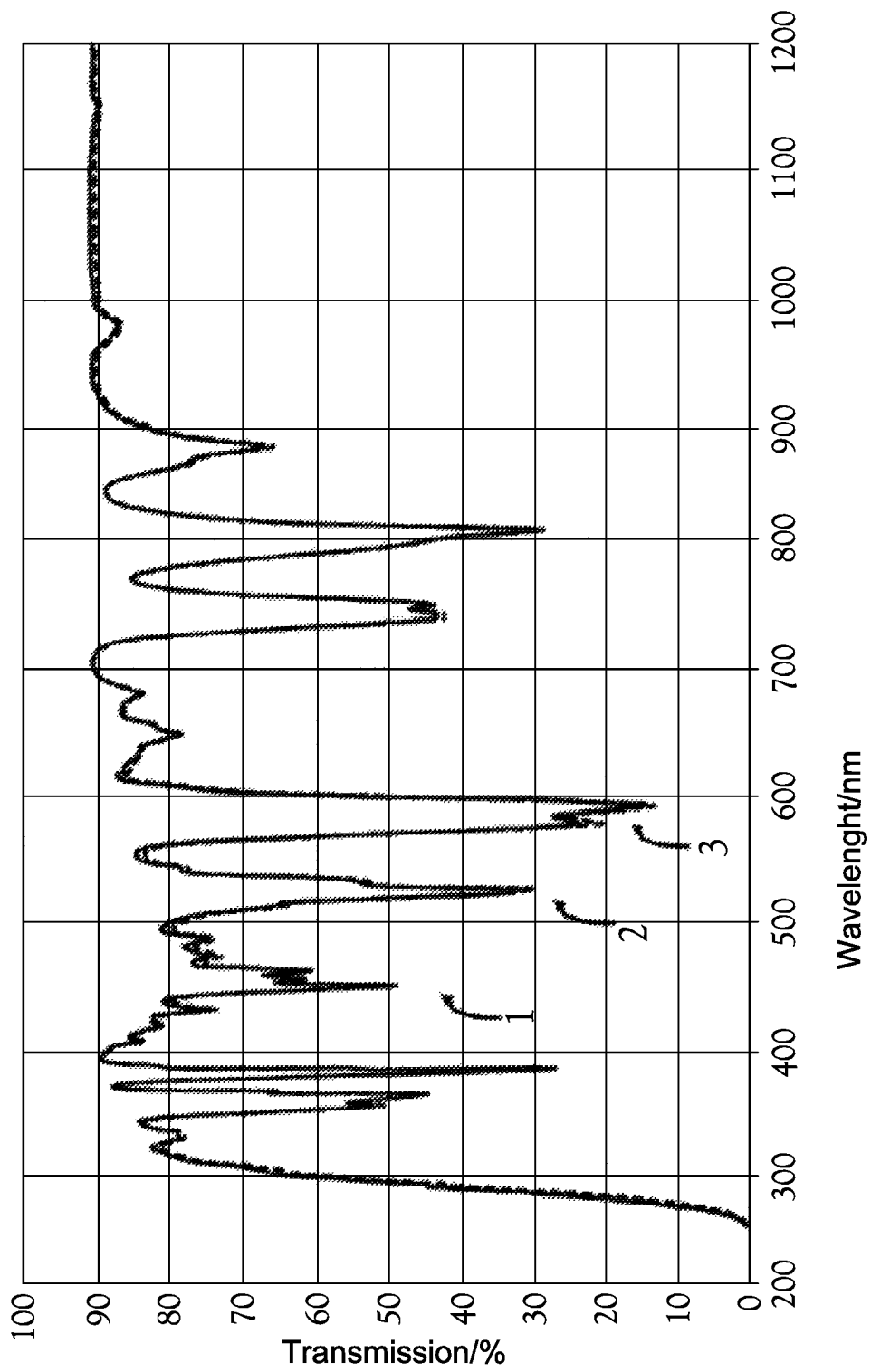
FIG. 5 shows the transmission spectrum of a third embodiment of a glass composition according to the invention with a thickness of about 0.7 mm in comparison to the inventive composition of the first embodiment with a thickness of 0.9 mm.

A comparison of the visible spectrum of embodiment 1 at 0.9 mm thickness to the third embodiment with a thickness of 0.7 mm is shown in FIG. 5. The glass of the third embodiment has a transmission value of about 62.5% in the visible spectra range between 380 and 780 nm. The first absorption maximum 1 at 446 nm has a value of about 48.7%, the second absorption maximum 2 at 521 nm has a value of 30.8% and the third absorption maximum 3 at 585 nm of 14.6%.

Figure 6A:
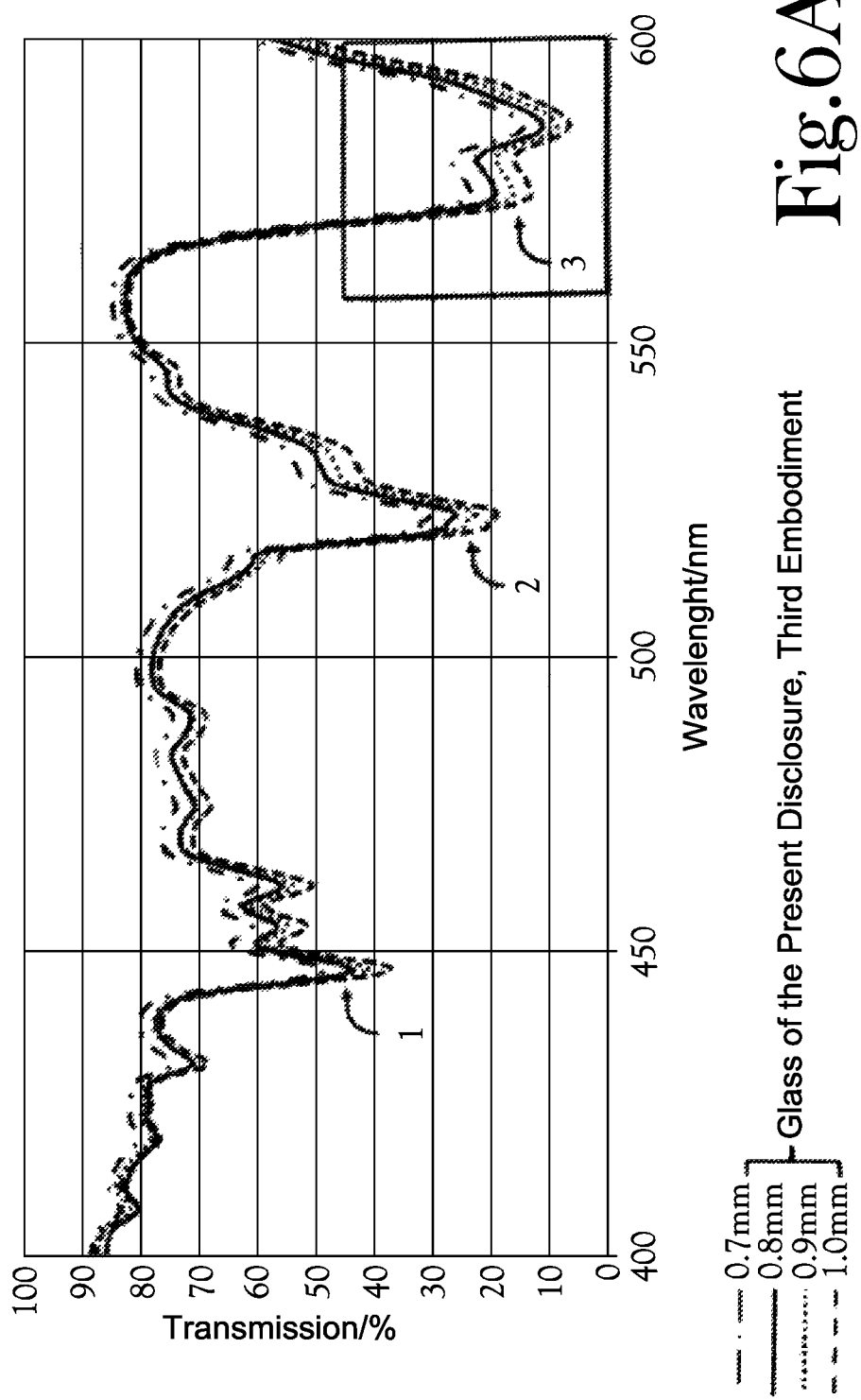
FIG. 6a shows the transmission of a glass according to a third embodiment with glass thickness between 0.7 mm and 1.0 mm in the wavelength range of 400 nm to 600 nm.

In FIG. 6a a section of the transmission spectra of the glasses of the third embodiment is shown for four different thicknesses in the wavelength range between 400 and 600 nm. For a better view FIG. 6b shows an even smaller section including only the main absorption maxima of $Nd_2O_3$ in the wavelength area between 560 and 600 nm for all four thicknesses. To underline the resulting differences in the transmission value and the depth of the absorption maxima, Table 1 is given. The thickness of the glasses varies from 0.7 mm to 1.0 mm.

It is obvious that the glass of the third embodiment would not be suitable for laminated lenses for each of the stated glass thicknesses. Only glass thicknesses of less than 0.8 mm would be compliant with the international sunglass norms regarding the minimum peak at 585 nm. The absorption caused by the increased $Nd_2O_3$ concentration is too strong to fulfil the requirement of at least 20% of the transmission in the visible spectral range (0.2 $\tau_v$). $\tau_v$ D65 denotes the transmission
in the visible spectral range measured with light source D65.

TABLE 1

Exemplary characteristic of glasses of the third embodiment with thicknesses between 0.70 mm and 1.00 mm

| | thickness | | | |
|---|---|---|---|---|
| | 0.70 mm | 0.80 mm | 0.90 mm | 1.00 mm |
| $\tau_v$ D65 [%] | 62.5 | 59.4 | 58.0 | 55.7 |
| $\tau_{446\ nm}$ [%] | 48.7 | 44.1 | 41.5 | 37.8 |
| $\tau_{521\ nm}$ [%] | 30.8 | 26.3 | 23.1 | 19.7 |
| $\tau_{585\ nm}$ [%] | 14.6 | 11.4 | 9.0 | 6.9 |
| $0.2 \cdot \tau_v$ | 12.5 | 11.9 | 11.6 | 11.2 |

In the present invention the use of nickel oxide is preferable to obtain the requested depth of lower 52% for the absorption maximum at about 446 nm.

Without nickel oxide especially the concentration of holmium oxide has to be adjusted even if the thickness of 0.9 mm is the same as for the first stated embodiment holmium oxide has to be increased about 0.8 wt.-%. From the economical point of view this needs to be considered as holmium oxide is the most expensive of the three used rare earth materials. In case of the third embodiment, if NiO is not present, the holmium content has to be adjusted in order to receive the same transmission since NiO supports the holmium oxide. The glass of the fourth embodiment of the invention comprises in weight percent:

56.50 wt.-% $SiO_2$
7.70 wt.-% $B_2O_3$
12.40 wt.-% $Na_2O$
3.00 wt.-% $K_2O$
3.10 wt.-% ZnO
8.40 wt.-% $Nd_2O_3$
5.50 wt.-% $Er_2O_3$
2.80 wt.-% $Ho_2O_3$
0.30 wt.-% $Sb_2O_3$
0.30 wt.-% $Cl^-$

The comparison of the transmission spectra of the first and fourth embodiment is shown in FIG. 7. The visible spectral transmission of a lens element according to the fourth embodiment is about 64.5%. The first absorption maximum 1 at 446 nm has a value of about 46%, the second absorption maximum 2 at 521 nm has a value of 30% and the third absorption maximum 3 at 585 nm of 13.3%.

As erbium oxide is the least expensive of the three used earth elements a fifth composition is stated to show another possibility of an inventive glass. The transmission in the visible spectral range was kept constant compared to the glass of the fourth embodiment. The fifth embodiment has an $Er_2O_3$ content of 6.0 wt.-% which influences the absorption at 521 nm.

The glass of the fifth embodiment of the invention comprises:

56.40 wt.-% $SiO_2$
7.65 wt.-% $B_2O_3$
12.35 wt.-% $Na_2O$
3.00 wt.-% $K_2O$
3.10 wt.-% ZnO
8.10 wt.-% $Nd_2O_3$
6.00 wt.-% $Er_2O_3$
2.80 wt.-% $Ho_2O_3$
0.30 wt.-% $Sb_2O_3$
0.30 wt.-% $Cl^-$

Figure 8:
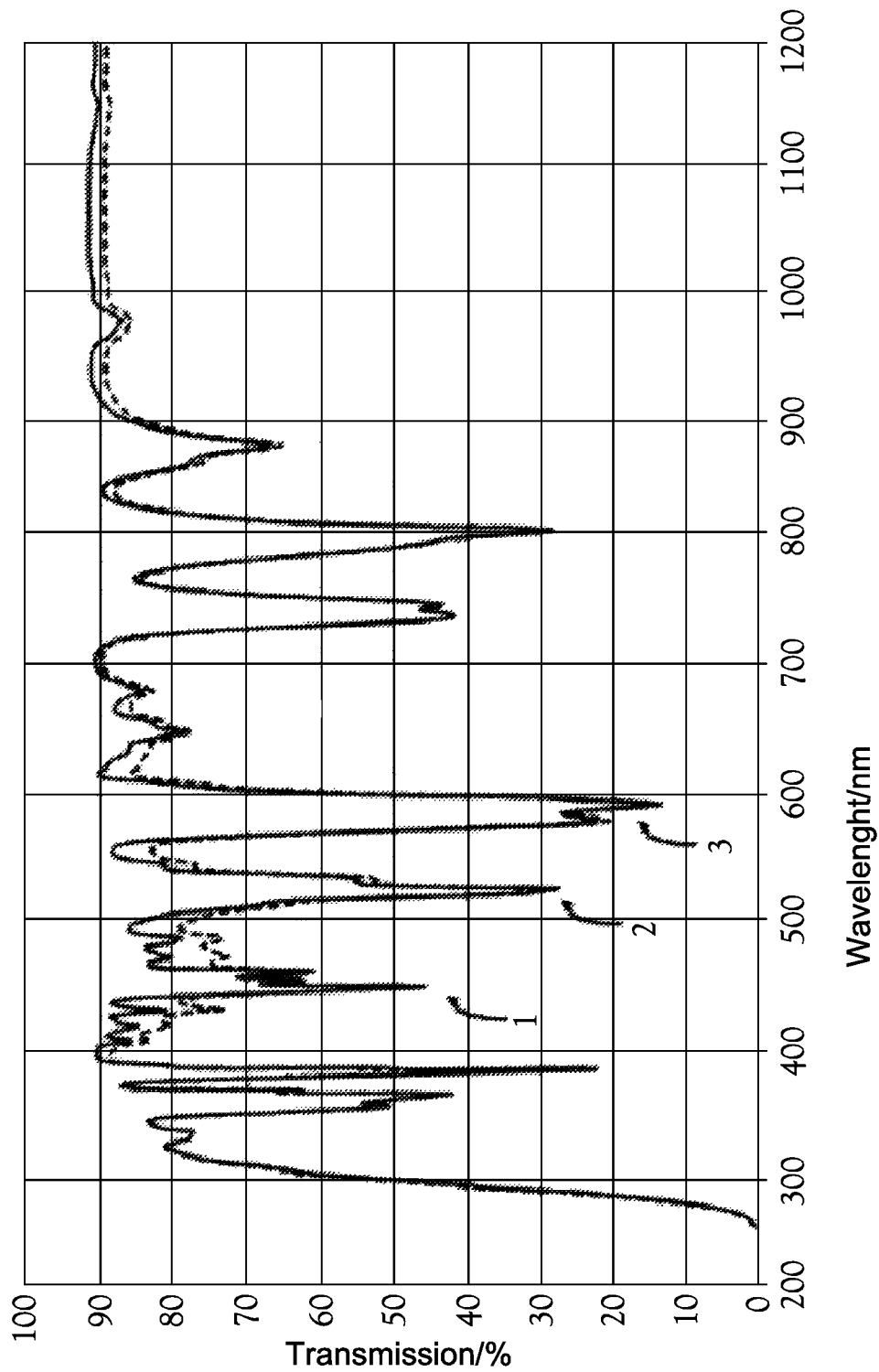
FIG. 8 shows a comparison of the transmission spectra between a 0.9 mm thick glass element of the first and a fifth embodiment of a glass composition according to the invention.

A glass according to the fifth embodiment, without nickel oxide and increased erbium oxide, is compared to a glass according to the first embodiment in FIG. 8. At a thickness of 0.9 mm the glass of the fifth embodiment has a transmission value of 64.5%. The first absorption maximum 1 at 446 nm has a value of about 46%, the second absorption maximum 2 at 521 nm has a value of about 28% and the third absorption maximum 3 at 585 nm of 13.9%. It is obvious that both embodiments lead to comparable contrast enhancing glasses, whereby the fifth embodiment favours the absorption at 520 nm without reducing the contrast enhancement caused by $Nd_2O_3$ too much. The added rare earth materials, neodymium oxide, erbium oxide and holmium oxide are part in all glass compositions. The rare earth materials are filtering parts of the blue-violet, green and yellow wavelengths. The result is the disclosed contrast enhancing sunglass. The transmission behaviour is visible regardless of the existing lightning conditions. In daylight the real colours will essentially not be distorted and the glass acts contrast enhancing.

According to the knowledge of the inventors this invention for the first time shows a glass composition comprising of three rare earth materials neodymium oxide, erbium oxide and holmium oxide, especially for a sunglass lens. The glass according to this disclosure shows three main absorption bands in the range of 400 to 600 nm at about 446 nm, 521 nm and approximately at 585 nm. The glass is contrast enhancing and has a nearly neutral colour. In a preferred embodiment the glass has a thickness of less or equal to 1.0 mm, preferably 0.9 mm and has a total transmission in the visible spectral range between 380 nm to 780 nm of about 61%. For certain wavelength areas the transmission is lot higher, up to 90% in the visible spectral range between 380 to 780 nm. The glass of this disclosure is a dichroitic, grey or bluish-purple sunglass with the filter category 1. The invented glass can be bonded e.g. with a silicate glass and an appropriate glue which can block UV-radiation up to 400 nm in the laminate. To further improve the melting process (lower energy costs and to conserve the tank material) a high amount of suitable glass cullets or glass powder can be used.

An especially preferred embodiment of the invention comprises in wt.-%

52-60 $SiO_2$, preferably 55-58 $SiO_2$
5-11 $B_2O_3$, preferably 7-10 $B_2O_3$
8-15 $Na_2O$, preferably 10-14 $Na_2O$
1-5 $K_2O$, preferably 2-4 $K_2O$
1-5 ZnO, preferably 2-4 ZnO
5-12 $Nd_2O_3$, preferably 6-11 $Nd_2O_3$, most preferred 6-10 $Nd_2O_3$
4-8 $Er_2O_3$, preferably 5-7 $Er_2O_3$
1-5 $Ho_2O_3$, preferably 2-4$Ho_2O_3$
0.1-1.0 $Sb_2O_3$, preferably 0.1-0.5 $Sb_2O_3$
0.1-0.5 $Cl^-$, preferably 0.2-0.4 $Cl^-$
0-0.05 NiO, preferably 0.02-0.04 NiO These glasses provide unexpected for a high contrast compared to glasses described in DE 10 2015 224 374 B3. Further the glasses have a main absorption due to neodymium oxide which has a lower transmission value than for the glass described in DE 10 2015 224 374 B3 at 585 nm. Furthermore the amount of rare earth materials $Nd_2O_3$, $Er_2O_3$, $Ho_2O_3$ is higher than described for the glass disclosed in DE 10 2015 224 374 B3. Even though, the glass according to the invention has a comparable transmission for the visible spectral range then the glass described in DE 10 2015 224 374 B3. For a 0.9 mm thick glass an unexpected high transmission of at least 60% over the visible spectral range from 380 mm to 780 nm could be achieved.

The preferred embodiment of the invention further is free of—bromine and/or CuO, $Cu_2O$ despite impurities. Additionally the boron content is comparably low. This glass has the advantage that it is easier to melt and only needs a simple cooling procedure.

With regard to low thicknesses e.g. between 0.7 and 1.0 mm, the glasses are remarkably contrast enhancing due to the high rare earth content even though it belongs to filter category 1.

Example embodiments of the present general inventive concept can be achieved by providing a glass composition, especially a contrast enhancing glass, preferably a contrast enhancing sunglass, comprising:
- 45-65 wt.-%, preferably 50-60 wt.-% $SiO_2$
- 0-12 wt.-%, preferably 5-10 wt.-% $B_2O_3$
- 0-15 wt.-%, preferably 5-15 wt.-% $Na_2O$
- 0-10 wt.-%, preferably 1-5 wt.-% $K_2O$
- 0-7 wt.-%, preferably 1-5 wt.-% ZnO, characterized in that the glass composition further comprises:
- 1-12 wt.-%, preferably 5-11 wt.-% $Nd_2O_3$, most preferred 6-10 wt.-% $Nd_2O_3$
- 1-10 wt.-%, preferably 5-7 wt.-% $Er_2O_3$
- 0.5-8 wt.-%, preferably 1-5 wt.-% $Ho_2O_3$
- 0.00-0.05 wt.-%, preferably 0.01-0.04 wt.-%, especially 0.02-0.04 wt.-% NiO.

The glass composition can include:
- 52-60 wt.-% $SiO_2$, preferably 55-58 $SiO_2$ wt.-%
- 5-11 wt.-% $B_2O_3$, preferably 7-10 $B_2O_3$ wt.-%
- 8-15 wt.-% $Na_2O$, preferably 10-14 $Na_2O$ wt.-%
- 1-5 wt.-% $K_2O$, preferably 2-4 $K_2O$ wt.-%
- 1-5 wt.-% ZnO, preferably 2-4 ZnO wt.-%
- 5-12 wt.-% $Nd_2O_3$, preferably 6-11 $Nd_2O_3$ wt.-%
- 4-8 wt.-% $Er_2O_3$, preferably 5-7 $Er_2O_3$ wt.-%
- 1-5 wt.-% $Ho_2O_3$, preferably 2-4 $Ho_2O_3$ wt.-%
- 0-0.05 wt.-% NiO, preferably 0.02-0.04 NiO wt.-%.

The glass according to any of the embodiments described above can be characterized in that the glass beside impurities caused by the raw material is free of copper and/or bromine The glass according to any one or more of the embodiments above can be characterized in that the glass further comprises:
- 0-8 wt.-%, preferably 0-5 wt.-% $Pr_6O_{11}$ and/or
- 0-8 wt.-%, preferably 1-5 wt.-%, especially 2-5 wt.-% $Al_2O_3$ The glass according to any of the embodiments above can further comprise:
- 0.1-3.0 wt.-%, preferably 0.1-1.0 wt.-% $Sb_2O_3$. and/or
- 0-0.5 wt.-%, preferably 0.1-0.5 wt.-%, most preferred 0.2-0.4 wt.-% Cl⁻ and/or
- 0.1-2.0 wt.-%, preferably 0.5-1.5 wt.-% $NO_3$.

The glass according to any one or more of the embodiments above can be characterized in that the glass is free from manganese oxide and vanadium oxide except for impurities caused by the raw materials.

The glass according to any one or more of the embodiments above can be characterized in that the glass has a thickness between 0.5 and 1.0 mm, preferably between 0.7 and 1.0 mm, most preferable between 0.7 and 0.9 mm.

The glass according to any one or more of the embodiments above can be characterized in that the glass has a total transmission TV (D65) in the visible spectral range from 380 to 780 nm of at least 60%.

The glass according to any one or more of the embodiments above can be characterized in that the glass has three main interferences at about 446 nm, 521 and approximately 585 nm and/or the main absorption maximum is at 585 nm.

The glass any one or more of the embodiments above can be characterized in that the transmission of the first absorption maximum at 446 nm is below 55%, preferably less than 52%, at a thickness of 1 mm, preferably at a thickness of 0.9 mm and/or the transmission of the second absorption maximum at 521 nm is below 35%, preferably less than 32% at a thickness of 1 mm, preferably at a thickness of 0.9 mm and/or the transmission of the third absorption maximum at 585 nm is below 20%, preferably less than 15% at a thickness of 1 mm, preferably at a thickness of 0.9 mm.

Example embodiments of the present general inventive concept can also be achieved by providing a process for producing a glass according to any one or more of the embodiments above, characterized in that a product is generated from a continuous tank melt which is pressed and cooled down according to a simple specified program.

Example embodiments of the present general inventive concept can also be achieved by providing a lens comprising at least a first lens element and a second lens element wherein the first lens element is adhered to a second lens element preferably by an adhesive layer most preferably including a UV-filter and characterized in that at least one lens element of the first lens element and the second lens element comprises a glass with a composition configured according to any one or more of the embodiments above.

The lens can be characterized in that a second lens element comprises a mineral glass or a plastic material. Example embodiments also include the use of a lens according to any one or more of the embodiments above as a spectacle lens or a sunglass lens.

The invention for the first time, especially for the preferred embodiment as disclosed above and according from the first to the fifth embodiment, discloses a glass with comparably low amounts of $Nd_2O_3$, $Er_2O_3$ and $Ho_2O_3$, a high contrast and a transmission of at least 60% in the visible spectral range.

The invention claimed is:

1. A glass composition, especially a contrast enhancing glass, preferably a contrast enhancing sunglass, comprising:
   - 45-65 wt.-% $SiO_2$;
   - 5-12 wt.-% $B_2O_3$;
   - 5-15 wt.-% $Na_2O$;
   - 1-10 wt.-% $K_2O$; and
   - 1-7 wt.-% ZnO;
   characterized in that the glass composition further comprises:
   - 5-12 wt.-% $Nd_2O_3$;
   - 1-10 wt.-% $Er_2O_3$;
   - 0.5-8 wt.-% $Ho_2O_3$; and
   - 0.00-0.05 wt.-% NiO;
   and in that the glass beside impurities caused by the raw material is free of copper and/or bromine.

2. A glass composition according to claim 1, further comprising 6-10 wt.-% $Nd_2O_3$.

3. A glass composition according to claim 1, further comprising 5-7 wt.-% $Er_2O_3$.

4. A glass composition according to claim 1, further comprising 1-5 wt.-% $Ho_2O_3$.

5. A glass composition according to claim 1, further comprising 0.01-0.04 wt.-% NiO.

6. The glass according to claim 1, characterized in that the glass further comprises:
   - up to 8 wt.-% $Pr_6O_{11}$
   and/or
   - up to 8 wt.-% $Al_2O_3$.

7. The glass according to claim 1, further comprising:
0.1-3.0 wt.-% $Sb_2O_3$
and/or
0.1-0.5 wt.-% $Cl^-$
and/or
0.1-2.0 wt.-% $NO_3$—.

8. The glass according to claim 1, characterized in that the glass is free from manganese oxide and vanadium oxide except for impurities caused by the raw materials.

9. A glass composition according to claim 1, comprising:
52-60 wt.-% $SiO_2$;
5-11 wt.-% $B_2O_3$;
8-15 wt.-% $Na_2O$;
1-5 wt.-% $K_2O$;
1-5 wt.-% ZnO;
5-12 wt.-% $Nd_2O_3$;
4-8 wt.-% $Er_2O_3$;
1-5 wt.-% $Ho_2O_3$; and
0-0.05 wt.-% NiO.

10. The glass according to claim 1, characterized in that the glass has a thickness between 0.5 and 1.0 mm.

11. The glass according to claim 1, characterized in that the glass has a thickness between 0.7 and 0.9 mm.

12. The glass according to claim 1, characterized in that the glass has a total transmission $T_v$ (D65) in the visible spectral range from 380 to 780 nm of at least 60%.

13. The glass according to claim 1, characterized in that the glass has three main interferences at about 446 nm, 521 and approximately 585 nm and/or the main absorption maximum is at 585 nm.

14. The glass of claim 1, characterized in that the transmission of the first absorption maximum at 446 nm is below 55%, at a thickness of 1 mm and/or the transmission of the second absorption maximum at 521 nm is below 35% at a thickness of 1 mm and/or the transmission of the third absorption maximum at 585 nm is below 20% at a thickness of 1 mm.

15. The glass of claim 1, characterized in that the transmission of the first absorption maximum at 446 nm is less than 52%, at a thickness of 0.9 mm and/or the transmission of the second absorption maximum at 521 nm is less than 32% at a thickness of 0.9 mm and/or the transmission of the third absorption maximum at 585 nm is less than 15% at a thickness of 0.9 mm.

* * * * *